United States Patent Office 3,817,880
Patented June 18, 1974

3,817,880
METHOD OF MAKING HIGH OPACITY RESIN POROUS FILMS AND AQUEOUS LATEX FOR PRODUCING SAID FILMS
Robert W. Kreider, St. Charles, Ill., assignor to De Soto, Inc., Des Plaines, Ill.
No Drawing. Filed Aug. 4, 1972, Ser. No. 277,918
Int. Cl. C08f 45/24; C08j 1/14
U.S. Cl. 260—2.5 M    18 Claims

ABSTRACT OF THE DISCLOSURE

An aqueous latex coating composition adapted to deposit films which dry to form a cellular layer of high opacity is provided by swelling the resin particles of the aqueous latex with a primary organic solvent which is essentially immiscible in the aqueous phase of the latex, such as xylene, and by introducing into the aqueous phase an at least partially water miscible organic solvent, such as propylene glycol, having a lower evaporation rate and a lesser capacity for solvating the resin of the latex than said primary solvent. When the primary solvent evaporates, a cellular film is formed, the secondary solvent serving to increase the opacification which is obtained. Particulate matter or material which crystallizes to form particulate matter is incorporated into the latex in small amount. The particulate matter serves to increase ultimate opacity and also to generate opacity more rapidly when a deposited film is dried.

---

The present invention is directed to the provision of aqueous latex coating compositions in which the resin particles of the latex are constituted by polymer of low opacity, the deposited latex drying to produce a cellular film which is opaque because the cells of the film function to scatter light. Opacity is speeded and enhanced by having a proportion of particulate matter present to further scatter the light.

It is known in the application of aqueous latex coating compositions to include a small proportion of organic solvent in the latex, this organic solvent normally functioning to enhance the coalescence of the polymer particles in the film which is deposited. This may aid in the formation of a continuous film using resin particles possessing a high glass transition temperature, but it does not contribute to the development of film opacity. Indeed, such a solvent by encouraging the formation of a continuous and uniform film, may actually serve to reduce film opacity. It is also possible to include in the aqueous latex, a proportion of water immiscible organic solvent, such as xylene, the xylene solvent being absorbed into the polymer particles to swell the same. When an aqueous latex coating composition containing resin particles swollen with water immiscible organic solvent is deposited and dried, the water immiscible solvent evaporates from the film which is formed, producing porosities or cells. As will be understood, the presence of porosities or cells causes light scattering and internal reflection to take place which provides an appearance of opacity. However, the xylene-swollen cells are soft and the cell walls have little strength. As a result, the cellularity which is induced is limited, apparently because many of the cells collapse and this limits the opacity which is obtained. Cell collapse is apparently induced primarily by the capillary pressures which are generated as the water evaporates while the particles coalesce. As a result, the achievement of opacity-inducing cellularity is largely limited to the use of an aqueous latex in which the dispersed particles are composite particles as in my prior application Ser. No. 239,303, filed Mar. 29, 1972, now abandoned.

I have also found, as disclosed in my prior application Ser. No. 239,719, filed Mar. 30, 1972, that when a secondary organic solvent is employed which is at least partially water miscible so that the secondary solvent remains largely in the aqueous phase of the latex, and when this secondary organic solvent has a lower evaporation rate than the primary solvent together with a lesser capacity for solvating the resin particles of the latex, then as the primary solvent evaporates during film formation, the cell walls are better maintained during the evaporation process and, as a result, a much greater opacification is obtained.

Unfortunately, and especially when using secondary solvents, the generation of desired opacity is slow, normally taking several hours or even a day or longer, and it is desired to have at least some reasonable opacity generated more rapidly. Also, it is always helpful to produce as much opacity as possible and to reinforce the surface where possible.

In this invention, there is added to the aqueous phase of the latex, either particulate matter, such as mineral filler or pigment, or water-soluble material, such as an inorganic salt, so that particles are formed in the film on drying. This adds to the ultimate opacity which is obtained, and provides immediate opacity, all without employing particulate matter under conductions providing extensive independent pigmentation.

Referring first to the polymer particles which are dispersed in the aqueous continuum of the latex, the chemical nature of these polymer particles is of secondary important. In preferred practice, and for the purpose of forming a film which will air dry, it is preferred to employ a polymer particle having a low glass transition temperature below 25° C., preferably below 0° C. However, polymer particles possessing higher glass transition temperatures may be used, especially when a moderate bake is used to enhance the coalescence of the polymer particles.

There is also normally employed a dispersing agent in order that the polymer particles will be stably dispersed in the aqueous continuum of the latex. The dispersing agent is normally constituted by a surface active agent which preferably includes a proportion of nonionic surface active agent. These surface active agents are normally present as the result of copolymerization in aqueous emulsion. The nonionic surfactants are not essential and, particularly when the primary organic solvent is aromatic, such as xylene or toluene, it has been found that anionic surface active agents, such as the sodium salt of dodecylbenzene sulfonic acid or sodium lauryl sulfate, are particularly beneficial. Excessive proportions of surfactant, especially nonionic surfactant, can plasticize the polymer particles and undesirably soften them, and should be avoided.

As will later be more fully discussed, the primary and secondary solvents are selected based on their capacity to solvate the polymer which is employed in the polymer particles and this will vary depending upon which polymer is selected. Thus, and while the chemical constitution of the polymer particle is not of primary significance, the chemical constitution of the polymer must be kept in mind in order to properly determine which organic solvents can be used.

In the preferred practice of this invention, the polymer particles are constituted by a copolymer of 20% by weight of ethylene with 80% by weight of vinyl acetate produced by copolymerization in aqueous emulsion. This provides a latex containing at least 20% by weight of polymer particles with the surfactant used being present in an amount below the critical micelle concentration so that the polymer particles can be used as a seed within which an approximately equal proportion of styrene is post polymerized. The composite polymer particles so-produced and their production are more fully described in my said companion application Ser. No. 239,303, filed Mar. 29, 1972. This same application discloses other composite polymer particles which may be used herein. As pointed out in said application, the final aqueous latex has a continuous aqueous phase in which is stably dispersed polymer particles of low glass transition temperature (below 25° C., preferably below 0° C.) having monomer which produces a polymer of high glass transition temperature (above 30° C.) polymerized therein.

On the other hand, the polymer particles need not be composite particles as described in my said application, but these may instead be polystyrene or polymethyl methacrylate emulsion polymers or emulsion copolymers containing styrene, methyl methacrylate or the like, together with, for purposes of illustration, from 5–25% of ethyl acrylate or butyl methacrylate or other monovinyl ester. When the noted homopolymers are used, baking is normally employed to help form a continuous film. Mixtures of polymer particles of low glass transition temperature with polymer particles of high glass transition temperature are also useful as, for example, 50 parts of polystyrene latex with 50 parts of a 20/80 ethylene/vinyl acetate copolymer latex. The air dry films made in this manner exhibit the opacity which is the primary purpose of this invention, but the blocking resistance obtained using composite particles and the physical toughness and adhesion obtained using composite particles is not generally duplicated. It is again stressed that all that is required herein from the standpoint of the polymer particle and the primary solvent is that the polymer particles be stably suspended in the aqueous medium and be capable of absorbing water immiscible organic solvent to cause the polymer particle to swell. Of course, the larger particles require less swelling to induce good opacification. In preferred practice, the polymer particles which are swollen by water immiscible solvent should have an average particle size of at least about 0.5 micron.

From the standpoint of the swollen polymer particle, a 5% volumetric increase in the polymer size is usually adequate. Indeed, it has been found that as little as 5 parts by weight of the primary solvent, per 100 parts of polymer, is enough to swell the polymer particles adequately to induce a degree of cellular formation on drying. It is preferred, however, to use a larger proportion of primary solvent, e.g., at least about 15 parts by weight of primary solvent per 100 parts by weight of polymer. In preferred practice, it has been found that from about 20 to about 80 parts of primary solvent per 100 parts of polymer are preferred, but it will be kept in mind that from the practical standpoint, it is desired to employ as little of the primary solvent as is consistent with the development of the best opacity.

The primary solvent which is employed should be essentially water immiscible. By this, it is meant that at least half of the primary solvent which is initially placed in the aqueous phase migrates from this phase into the polymer particles in order to swell the same. Conversely, less than 50% of the primary solvent remains in the aqueous phase. The primary solvent on being absorbed into the polymer particle necessarily swells the same, but there is a limit to the extent of solvency which can be tolerated since, when the primary solvent has an excessive capacity to dissolve the polymer particle, there results a degree of emulsion instability causing coagulation of the emulsion. The use of a small amount of divinylbenzene or polyacrylate, such as ethylene glycol dimethacrylate or the like, to cross-link the polymer particle increases the capacity to handle large amounts of primary solvent, but this is not essential. The careful addition of emulsion and/or latex stabilizer while the solvent is added also helps to prevent undesired coagulation. Aromatic solvents such as benzene, xylene, toluene, ethylbenzene, and the like, will illustrate primary solvents which are applicable to the swelling of all the polymer particles which are contemplated. Water immiscible aliphatic solvents which are adequately absorbed by the polymer particle are also applicable for use as the primary solvent, butyl Carbitol acetate and ethyl Carbitol acetate (Carbitol identifies diethylene glycol) being illustrative of this class of materials. Aliphatic hydrocarbons such as mineral spirits may also be used, though the mechanism of action may be more complex since crazing or microfracturing of the cell walls may also be induced. The desired swelling of the polymer particles requires absorption of at least about 5% by weight of the primary solvent. Preferred primary solvents are less volatile than water.

The secondary organic solvent is important in the combination under consideration. First, the secondary solvent must be at least partially water miscible so that the major proportion thereof remains in the water phase and does not migrate into the polymer particles until after the latex has been deposited and the water content of the latex largely evaporated. Preferred secondary solvents in accordance with this invention are illustrated by ethylene glycol, diethylene glycol, propylene glycol, butylene glycol, and polyethylene glycol having a molecular weight of about 150 and the like. 2-ethoxy ethanol and 2-ethoxy ethylene glycol will further illustrate the secondary solvents which may be used, but these tend to upset the stability of the emulsion and must be used with care, e.g., the proportion of use should be limited. In some instances where the primary solvent is sufficiently volatile, butyl alcohol may be used as the secondary solvent.

After the latex is deposited and a portion of the water evaporated, the water miscible organic solvent in the aqueous phase concentrates about the polymer particles in the deposited film and, it is thought, helps to stabilize the cells which are formed by the evaporation of the primary solvent, and also to produce other cells in the voids between the polymer particles. For this purpose and in normal practice, at least 20 parts of secondary solvent are desirably present per 100 parts of polymer particle. As little as about 5 parts of secondary solvent on the same basis provides limited improvement. It is preferred to employ a ratio of primary to secondary solvent such that the primary solvent is present in a weight ratio in the range of 2:1 to 1:3 with respect to the secondary solvent. A ratio of 25–50 parts of primary solvent to 50 parts of secondary solvent per 100 parts of polymer is presently considered to constitute best practice.

It is desired that the secondary solvent have a reduced capacity for solvating the polymer particles. It is believed that the reduced solvency of the secondary solvent stabilizes the cells which are formed. The action of the primary and secondary solvents is complex and it is possible that many cell forming mechanisms occur and cooperate in the production of the desired cellular construction. Accordingly, it is not intended to be limited by any theory of action.

It will be understood that the opacification which is desired is not obtained immediately when the above described latices are deposited and dried to a film. Instead, opacity is developed with the passage of time as the primary and secondary solvents evaporate from the film. The time for developing opacity can vary considerably, but this function normally requires several hours. In an illustrative situation, a contrast ratio of .55 is obtained in about 2½ hours whereas maximum opacification to a contrast ratio of .93 is obtained in about two days. Baking is particularly preferred to speed opacification and, when used, is preferably delayed until after the water has been removed as part of film formation. Also, the baking temperature must be low enough to avoid particle coalescence which depends on the nature of the resins used.

In order to determine the contrast ratio, the latex is drawn down across a sheet having a black area and a white area. The reflectance is then measured over the deposited coating, first over the white undersurfaced area, and then over the black undersurfaced area. The ratio of these two reflectances provides a contrast ratio which determines the degree of opacification. When the deposited coating is completely clear, the reflectance is very high over the white area, and is negligible over the black area providing a contrast ratio near 0. On the other hand, when the deposited coating is highly opaque, then the reflectance over each of the two areas is about the same and a perfect opacification would be evidenced by a contrast ratio of 1.0. From the standpoint of commercial practice, a contrast ratio of .88 or higher is considered to provide reasonably good performance. On the other hand, and in accordance with this invention, contrast ratios of 0.90 and higher are consistently obtained. These are normally measured in a dry film having a thickness in the range of 1.0-1.7 mils (6 mils wet).

The primary solvent can also be used to pull solvent-soluble dyes into the polymer particles and this provides a desirable technique for introducing chromatic effects. Very low proportions of dissolved dye yield films possessing deep tones so that this technique provides very attractive colors, and does so with great economy. This is illustrated by dissolving 0.25 part of a dye such as azo-oil-Blue Black dye (General Aniline) in 24.75 parts of xylene, and this was used in place of xylene itself to produce a film which was not only opaque, but which was colored a medium shade of blue with moderate intensity. This is a considerable depth of color from a very small amount of dye.

The crucial feature of this invention is the incorporation of small amounts of particulate matter into the cellular structure so that opacity is developed more rapidly or more extensively (preferably both).

The particulate matter may be constituted by a conventional pigment, illustrated by titanium dioxide. The development of good opacity through pigmentation normally requires a very large amount of pigment, e.g., a pigment to binder weight ratio of 1:1 or higher. In this invention, a pigment to binder ratio of less than 0.4:1 is used, normally less than 0.2:1. The binder is the resin component of the latex. Thus, up to 40 parts of particulate matter may be used per 100 parts of resin. Preferred practice in this invention would use from 2-15 parts of particulate matter per 100 parts of the resin binder, a ratio of 0.02:1 to 0.15:1. As little as 1 part of particulate matter has been shown to provide a striking improvement in contrast ratio and, hence, it is estimated that as little as 0.2 part of particulate matter per 100 parts of binder will provide some detectable benefit.

In these small proportions, the hiding power of the pigment itself is clearly secondary to the development of opacity through cell formation. It is thought that the particles provide a nucleating effect, helping the resin particles to stick together at a common point or points, and this minimizes cell collapse. These particles may also distort or cloud the cell walls, making them less transparent. It is stressed that the particulate matter may be soluble or insoluble since the same general effect is obtained when a dissolved component crystallizes in the film as when the particle retains its particulate form in the latex.

There is presented herewith a Table I which demonstrates with titanium dioxide the extent to which small amounts of a conventional pigment improve the contrast ratio.

TABLE I

| Parts TiO$_2$* | 1 hr. | 2 hrs. | 3 hrs. | 4 hrs. | 5 hrs. | 6 hrs. | 7 hrs. | 22 hrs. |
|---|---|---|---|---|---|---|---|---|
| 0 | .31 | .32 | .34 | .37 | .40 | .45 | .48 | .82 |
| 1 gram | .32 | .33 | .33 | .37 | .40 | .46 | .51 | .85 |
| 5 grams | .45 | .45 | .44 | .46 | .48 | .53 | .56 | .87 |
| 10 grams | .65 | .65 | .65 | .65 | .65 | .67 | .68 | .89 |
| 15 grams | .74 | .75 | .74 | .74 | .75 | .77 | .79 | .92 |

*Grams of titanium dioxide per 100 parts of binder. (See Example for precise details of formulation tested.)

As can be seen, as little as 1 gram of titanium dioxide per 100 parts of binder raised the ultimate contrast ratio from .82 to .85, a considerable improvement. Correspondingly, 5 grams of titanium dioxide raised the 1 hour contrast ratio of .31 to .45, a striking improvement. The tabulated data clearly establishes that small amounts of titanium dioxide, insufficient per se to provide any significant pigmentary hide, increase opacity in the present invention, and the improvement extends to the opacity produced over a short period of time, and also to the opacity which is ultimately realized, e.g., at equilibrium.

It is stressed that while titanium dioxide is a preferred particulate material, the invention is not so limited and improved opacity has also been obtained using calcium carbonate and clay, which are much less expensive. Particle size has some significance in this invention, since experience indicates that the smaller the particle size, the better the opacity, but any finely divided powder can be used which can be dispersed in the aqueous coating composition. Very finely divided materials, such as colloidal silica, are quite effective, and are useful in very small amount, possibly because of the small particle size involved.

On the other hand, powders are not essential since the particles can form in situ, as the water and solvents evaporate. Benzoic acid, common table salt, and sodium silicate illustrate soluble materials which crystallize out of solution and which have been established to improve opacity when used in the amounts disclosed herein.

Another interesting aspect of this invention is the optional use of water soluble thickening agents in the aqueous compositions under consideration. These are illustrated herein by hydroxy ethyl cellulose, but polyvinyl alcohol, polyacrylic acid, and sodium alginate will further illustrate the materials which are known for this purpose. These thickening agents in sufficient proportion induce an immediate opacity which decreases with time and then increases again, sometimes to persist and provide greater ultimate opacity. For example, the formulation used in Table I was reproduced using 40% more hydroxy ethyl cellulose. The 1 hour opacity was .43, much higher than the value of .31 in Table I. However, after 4 hours, opacity had dropped to .34, lower than the corresponding 4 hour value of .37 in Table I. After 6 hours, opacity had only risen to .40, compared with .45 in Table I. Despite this, the ultimate opacity was .86, higher than the .82 in Table I. Now, when the composition with 40% more hydroxy ethyl cellulose was pigmented with 5 grams of titanium dioxide per 100 grams of binder, the 1 hour opacity was .62, the contrast ratio never fell below .55, and the ultimate opacity was .90. The improvement occurs quickly, loss in opacity during the first few hours is minimized, and the ultimate opacity is improved, both by the thickener and by the trifling pigmentation.

With 10 grams of titanium dioxide, the 1 hour contrast ratio was .74, it never fell below .71, and it then rose to .92, indicating outstanding opacity.

The invention is illustrated in the following examples.

EXAMPLE 1

1512 parts of an ethylene-vinyl acetate seed polymer latex (see note 1) are mixed with 304.0 parts of distilled water in a 3 liter flask. The ethylene-vinyl acetate polymer contains about 20% ethylene, 80% vinyl acetate, with a trace (.15%) of methacrylic acid. The latex has a solids content of 52.8% and the particles have an average particle size of 0.46 micron (by light scattering).

798 parts of styrene are then added to the seed latex in the flask with stirring for 15 minutes. Heat is slowly applied (45 minutes) until the flask contents are at 65° C. at which time there is added a solution of 4.0 parts potassium persulfate in 160 parts of distilled water. The temperature is maintained at 65° C. and a solution of 26.6 parts of the sodium salt of dodecyl benzene sulfonic acid in 488 parts of distilled water is slowly added over a period of 1½ hours. In this way, the latex is maintained close to its point of instability to minimize the proportion of anionic surfactant in the water phase. The 65° C. temperature is then maintained for an additional 3½ hours whereupon the product is cooled to 30° C., removed from the flask, and filtered through a 60 mesh screen.

Note 1.—The seed polymer latex is made by precharging a pressure vessel with 2500 grams of water, 44 grams of hydroxyethyl cellulose, 6.6 grams of sodium bicarbonate, 154 grams of an ethylene oxide condensate with isooctyl phenol (10 mols of oxide per mol of phenol), and 22 grams of potassium persulfate. The feed lines to the vessel are rinsed with 1252 grams of water (degassed). It is estimated that the pressure vessel included 35 grams of residual water from a previous run. The reactor is closed and then heated with agitation and, at 80° C., the vessel is pressurized with ethylene to a pressure of 800 p.s.i.g. Also, at 80° C., vinyl acetate containing a trace of glacial methacrylic acid is added slowly. Over 2½ hours, 3513.4 grams of vinyl acetate and 6.6 grams of methacrylic acid are added while the temperature of 80° C. and the pressure of 800 p.s.i.g. are maintained. Then, 4.5 grams of potassium persulfate in 220 grams of water are added rapidly and the feed lines are rinsed into the vessel with 160 grams of water (it is estimated that 60 grams of water are held up in the feed lines). The temperature is then raised to 85° C. and held for 1 hour before cooling to provide the desired final product.

It is desired to point out that Example 1 provides an aqueous latex containing dispersed composite polymer particles. On coating and air drying, these polymer particles coalesce to form a hard, tough and adherent continuous film on metal, paper, glass etc. The polymer particles, by microscopic examination, have an average particle size of about 1 micron. The deposited film, wihtout pigment, is translucent and has a contrast ratio of .15 at about 1.5 mil dry film thickness.

EXAMPLE 2

213 grams of the latex of Example 1 (100 grams of polymer solids) are placed in a flask and 5 grams of sodium lauryl sulfate are then mixed with 50 grams of propylene glycol and 35 grams of xylene are added to the mixture. This mixture is then added to the latex in the flask with stirring at 25–30° C. over a period of 1 hour. The particulate matter is then added and the mixture is stirred for 25 minutes. Then 25 grams of hydroxy ethyl cellulose (2% aqueous solution) are added and stirring is continued for 20 minutes.

When titanium dioxide is used as the particulate material, it is predispersed in water with the aid of surfactants by adding 675 grams of titanium dioxide rutile to a ½ gallon pebble mill half filled with pebbles. There are then separately mixed 213 grams water, 6.0 grams of potassium tripolyphosphate and 9 grams of the ethylene oxide condensate with isooctyl phenol (10 moles of ethylene oxide per mole of the phenol). If desired, a small amount of water insoluble defoamer may be added to the mixture to minimize foaming, but this is not essential. The mixture is added to the titanium dioxide in the pebble mill which is then operated for 18 hours to form a pigment paste.

The data provided in Table I is obtained using the titanium oxide paste described above incorporated in the mixture of this example to provide the amounts of titanium dioxide set forth in the Table.

If calcium carbonate is to be dispersed, 100 grams thereof are added to 30 grams of water containing 0.5 grams of potassium tripolyphosphate. High speed agitation is then applied for ½ hour to provide the desired dispersion. Clay is handled in the same way, except more water is used (45 grams).

Soluble particulate materials may be dissolved as desired, e.g., inorganic salts such as sodium chloride may be dissolved in the water, and organic materials, such as benzoic acid, may be dissolved in the propylene glycol.

The invention is defined in the claims which follow.

I claim:

1. A method of forming a film of high opacity from resin low opacity comprising depositing a film of an aqueous latex coating composition consisting essentially of an aqueous continuous phase having stably suspended therein polymer of emulsion polymerized unsaturated monomer in the form of particles of low opacity organic solvent-soluble resin, said polymer particles being swollen by having absorbed therein at least 5 parts by weight per 100 parts of polymer of a primary organic solvent which is essentially immiscible in the aqueous phase of said latex, and at least 5 parts by weight per 100 parts of polymer of a secondary water-miscible organic solvent in said aqueous phase, said secondary organic solvent having a lower evaporation rate than said primary solvent and a lesser capacity for solvating said polymer, said composition further including at least 0.2 part up to 40 parts of particulate matter per 100 parts of resins, drying said film to form a dried film of low opacity, and then further drying said film to remove said organic solvents and thereby generate opacity-inducing cells in said film, said particulate matter increasing the rate at which opacity is generated.

2. A method as recited in claim 1 in which said particulate matter is a pigment.

3. A method as recited in claim 1 in which said particulate matter is a mineral filler.

4. A method as recited in claim 1 in which said particulate matter is dissolved in the aqueous continuous phase of said latex to crystallize in the film which is produced when the water of the latex is evaporated.

5. A method as recited in claim 1 in which said primary and secondary organic solvents are each used in an amount of at least 5 parts by weight per 100 parts of polymer.

6. A method as recited in claim 5 in which said particulate matter is titanium dioxide.

7. A method as recited in claim 5 in which said particulate matter is finely divided silica.

8. A method as recited in claim 5 in which said particulate matter is present in an amount of from 2–15 parts of particulate matter per 100 parts of resin.

9. A method as recited in claim 1 in which a water soluble thickening agent is present in the aqueous continuous phase of the latex.

10. A method as recited in claim 1 in which said primary organic solvent is used in an amount of from about 20 to about 80 parts per 100 parts of polymer and said secondary solvent is a volatile glycol.

11. A method as recited in claim 10 in which said primary organic solvent is aromatic.

12. A method coating as recited in claim 1 in which said polymer particles have a glass transition temperature below 25° C. and said solvent-swollen polymer particles have an average diameter of at least about 0.5 micron.

13. An aqueous latex as recited in claim 1 in which said polymer particles are particles of polymer having a glass transition temperature below 25° C. modified by having monomer which produces a polymer having a glass transition temperature above 30° C. post polymerized in their presence.

14. A method as recited in claim 1 in which said water immiscible organic solvent has solvent-soluble dye dissolved therein.

15. A method as recited in claim 1 in which the polymer particles of said latex are selected from emulsion polymers and emulsion copolymers containing styrene or methyl methacrylate.

16. A method as recited in claim 1 in which mixtures of polymer particles of low glass transition temperature with polymer particles of high glass transition temperature are used.

17. A method as recited in claim 15 in which said secondary solvent is propylene glycol.

18. An aqueous latex coating composition adapted to deposit a film of low opacity resin which dries to produce a cellular film of high opacity, consisting essentially of an aqueous continuous phase having stably suspended therein polymer of emulsion polymerized unsaturated monomer in the form of particles of low opacity organic solvent-soluble resin which is a mixture of polymer having a glass transition temperature below 25° C. and polymer having a glass transition temperature above 30° C., said polymer particles being swollen by having absorbed therein at least 5 parts by weight per 100 parts of polymer of aromatic hydrocarbon, and at least 5 parts by weight per 100 parts of polymer of propylene glycol in said aqueous phase, said composition further including at least 0.2 part up to 40 parts of particulate matter per 100 parts of resin, whereby, when said latex is deposited and dried, said solvents will evaporate to produce a film containing opacity-inducing cells, and said particulate matter will increase the rate at which opacity is generated.

References Cited
UNITED STATES PATENTS

| | | | |
|---|---|---|---|
| 3,554,789 | 1/1971 | Kigane et al. | 264—49 |
| 3,450,650 | 6/1969 | Murata | 260—2.5 M |
| 3,661,807 | 5/1972 | Seiner | 260—2.5 M |

MURRAY TILLMAN, Primary Examiner

M. FOELAK, Assistant Examiner

U.S. Cl. X.R.

260—2.5 R, 8, 17 A, 29.6 TA, 29.6 R, 29.6 RB, 29.6 MH, 29.6 ME, 29.6 WA, 41 R, 41 B; 264—49

UNITED STATES PATENT OFFICE
CERTIFICATE OF CORRECTION

Patent No. 3,817,880            Dated June 18, 1974

Inventor(s) Robert W. Kreider

It is certified that error appears in the above-identified patent and that said Letters Patent are hereby corrected as shown below:

Column 3, line 72, "emulsion" should read --emulsifier--.
Column 5, line 74, "Example" should read --Example 2--.
Column 8, claim 1, line 2 of the claim, "resin low" should read --resin of low--.
Column 8, claim 13, line 1 of the claim, "An aqueous latex" should read "A method--.

Signed and sealed this 17th day of December 1974.

(SEAL)
Attest:

McCOY M. GIBSON JR.          C. MARSHALL DANN
Attesting Officer             Commissioner of Patents